United States Patent Office 2,799,680
Patented July 16, 1957

2,799,680
HALOGEN ANALOGS OF TROPINE BENZHYDRYL ETHER AND METHOD OF PREPARATION THEREOF

Stephen Fromer, Staten Island, N. Y.

No Drawing. Application February 18, 1954,
Serial No. 411,271

12 Claims. (Cl. 260—294.7)

This invention relates to new and useful chemical compounds having antihistaminic and antispasmodic properties and, more particularly, to tropine benzhydryl ethers which are halogenated in at least one benzene ring and to their preparation. This application is a continuation-in-part of my copending application Serial No. 270,521, filed February 7, 1952 (now abandoned).

Unhalogenated tropine benzhydryl ethers and certain of their acid addition salts are known. These compounds have antispasmodic and antihistaminic action but of a nature and duration which restrict their potential utilization. Such compounds are prepared by the reaction of tropine with diphenyldiazomethane. Since the inherent limitations of these compounds have been recognized, it has been sought to improve upon them, particularly by increasing the length of their effective action and by providing greater versatility of mode of production with good yields and smoother, less erratic conversions.

The present invention is predicated upon the discovery that halogenation of at least one of the benzene rings of tropine benzhydryl ether in at least one position has important and unexpected advantages in that the new halogen analogs thereby produced have markedly superior antispasmodic and antihistaminic effects of greater duration, which not only serve to extend the usefulness of these compounds but which render them more efficacious and desirable in use. Halogen analogs of tropine benzhydryl ether in accordance with the present invention can be made by new reactions which proceed smoothly with good conversions.

The new halogen analogs of tropine benzhydryl ether responding to the present invention are tropine benzhydryl ethers in which at least one halogen atom is substituted in at least one benzene ring but also include halogen substituents in both benzene rings and in more than one position in either such ring. While it has been found, in general, that the optimum benefits and advantages of the invention are obtained by mono-para-halogenation in one such benzene ring, the halogen atom need not necessarily be in the para position but may also be in the ortho position; when polyhalogenation is carried out, it has been found that good results are secured when the halogen atoms are in the para positions of both benzene rings or in the ortho and para positions of the same benzene ring.

Halogen analogs of tropine benzhydryl ether may be produced according to the following method, illustrated for the production of tropine 4-chlorobenzhydryl ether hydrochloride:

(1) The intermediate 4-chlorobenzophenone (Eastman, M. Pt. 73–5° C.) was reacted with anhydrous hydrazine to produce 4-chlorobenzophenone hydrazone which was then oxidized to 4-chlorodiphenyldiazomethane and reacted with tropine in accordance with the following reactions:

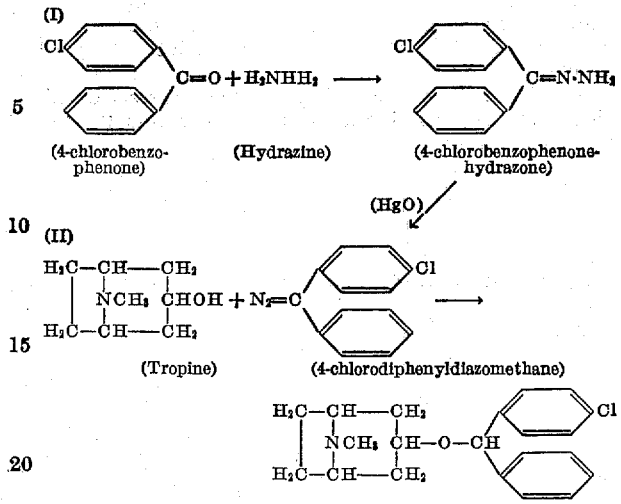

A hydrogenation bomb was charged with 90 g. (0.415 mol) of 4-chlorobenzophenone, 23 g. (23 ml., 0.72 mol) of anhydrous hydrazine and 100 ml. of specially denatured alcohol prepared pusuant to Formula 2B of the Bureau of Internal Revenue of the U. S. Treasury Department in accordance with Regulation 3 and held at a temperature of 150° C. for 4 hours. The resulting solution was diluted with 400 ml. of water and extracted with two 200 ml. portions of ether. The combined ether extracts were dried over $MgSO_4$, filtered and concentrated to a residue of 105 grams, there still being some ether present. This residue was then dissolved in 450 ml. of petroleum ether and transferred to a 1-liter 3-necked round-bottom flask equipped with a thermometer, mechanical stirrer and reflux condenser. Under vigorous agitation, 87 g. (0.4 mol) of yellow HgO were added over a period of 15 minutes. The reaction mixture slowly turned purple and very little heat was evolved. Stirring was continued overnight and then the mixture was filtered and the residue washed liberally with petroleum ether. The combined filtrate was concentrated in vacuo below 40° C. to a thick syrup which was added immediately to 56 g. (0.4 mol) of tropine and 35 ml. of benzene. The mixture was refluxed on a steam bath for 24 hours.

The reaction mixture was taken up in 200 ml. of benzene and extracted with 200 ml. of 2 N sulfuric acid. The aqueous layer was washed twice with 125 ml. of benzene and twice with 125 ml. of ether, and then alkalinized with a 35% aqueous sodium hydroxide solution. The liberated oil was extracted into ether and washed with 500 ml. of water. After drying over $K_2CO_3$, the ether solution was treated with alcoholic HCl until acid to Congo red paper. The resulting suspension was cooled to 0° C. for an hour and the hydrochloride filtered and washed with ether. The tropine 4-chlorobenzhydryl ether hydrochloride could be recrystallized either from isopropanol or from specially denatured alcohol prepared pursuant to Formula 2B of the Bureau of Internal Revenue of the U. S. Treasury Department in accordance with Regulation 3, and ether. The product had the following analysis:

Found:
| | |
|---|---|
| Carbon | 67.1 |
| Hydrogen | 6.7 |
| Hydrogen | 3.6 |

Calculated:
| | |
|---|---|
| Carbon | 66.7 |
| Hydrogen | 6.7 |
| Nitrogen | 3.7 |

By substituting silver oxide for HgO in accordance with application Ser. No. 397,045, filed December 8, 1953, by William Schroeder and now issued as Patent No. 2,710,862, vastly superior conversions could be achieved in a smoother manner with good yields and high purity. Alternatively, manganese dioxide may be used as the oxidizing agent in place of mercuric oxide with good results.

(2) In an alternative method, tropine was reacted with 4-chlorobenzhydryl chloride in accordance with the following reaction:

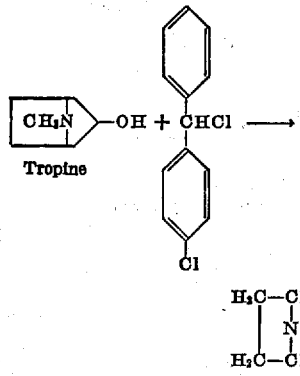

(3) In a further alternative method, 3-chlorotropane was reacted with 4-chlorobenzhydrol in accordance with the following reaction:

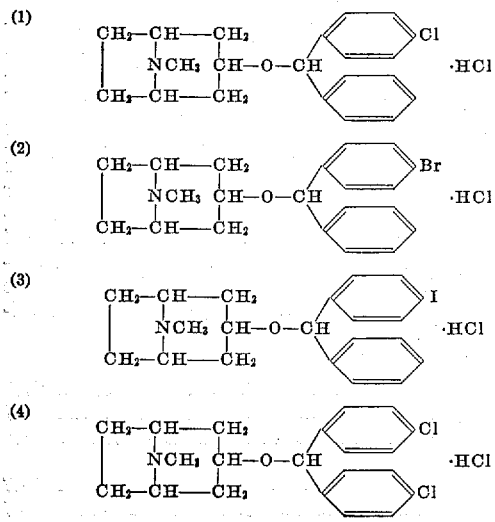

As to each of the foregoing methods, the other halogen analogs are produced in analogous manner.

The new compounds of the invention are illustrated by the following examples without limiting the same thereto:

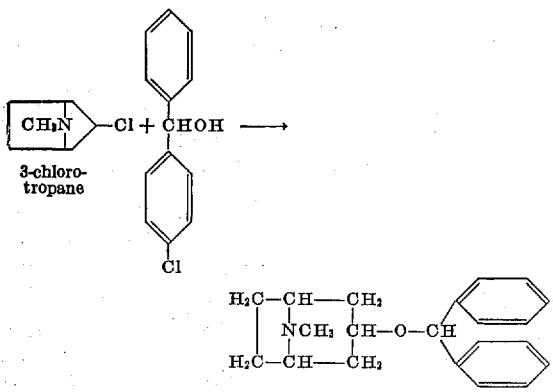

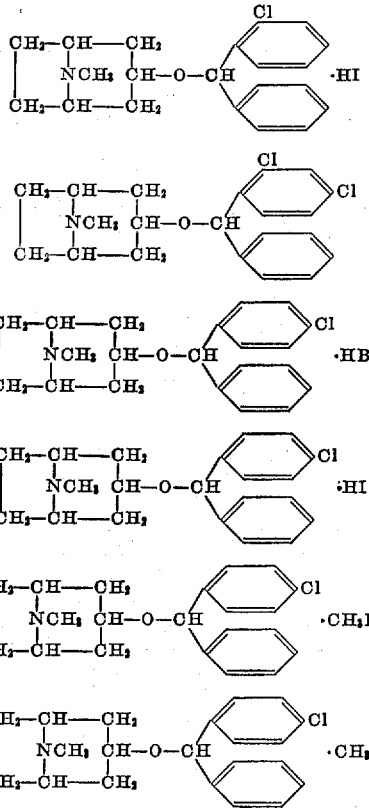

The melting points and solubilities of the above new compounds are as follows:

| Compound No. | Melting Point, °C | Water | Ethanol | Acetone | Benzene | Ether |
|---|---|---|---|---|---|---|
| 1 | 210—212 | sol | sol | insol | insol | insol |
| 2 | 175—177 | sol. hot | sol | insol | insol | insol |
| 3 | 162—164 | sol. hot | sol | insol | insol | insol |
| 4 | 212—214 | sol. hot | sol | sol. hot | sol. hot | insol |
| 5 | 192—194 | insol | sol. hot | sol | insol | insol |
| 6 | | | | | | |
| 7 | 197—200 | sol. hot | sol. hot | insol | insol | insol |
| 8 | 177—180 | sol. hot | sol. hot | sol. hot | insol | insol |
| 9 | 245—248 | sol. hot | sol | insol | insol | insol |
| 10 | 261—263 | sol | sol | insol | insol | insol |

In the above tabulation, "sol." means that the material is soluble to the extent of 5% weight-in-volume or higher in the solvent at 30° C. and "insol." means that the material is not completely in solution in the boiling solvent at a level of 5%.

Thus, it will be apparent that the invention is broadly directed to halogen analogs of tropine benzhydryl ethers wherein at least one of the benzene rings has at least one nuclear halogen substituent, and their acid salts. The halogen substituent may be any one of the halogens but chlorine and bromine have been found to be particularly desirable and satisfactory with chlorine producing the optimum results, particularly when it is in the para position. The new compounds may be obtained in the form of acid salts such as the hydrochloride, hydrobromide or hydroiodide as well as other salts such as the sulfate, methobromide or methochloride. The compounds delineated above have all been produced and tested and found to possess the advantages hereinabove stated. While the chloro-substituted compounds have been found to be best, and are therefore preferred, other halogen analogs, such as the bromo-substituted compounds, are also satisfactory and no halogen analog has been found to be inoperative.

Within the scope of the appended claims other halogen analogs are included and the compounds forming the invention may therefore be designated as "mono- and dihalogenated tropine benzhydryl ethers," the term "dihalogenated tropine benzhydryl ether" comprising compounds which are di-halogenated in a single benzene ring as well as compounds which are mono-halogenated in both rings.

Halogenated tropine benzhydryl ethers responding to the invention have been found to be useful and beneficial in the pathological and neurological conditions for which antispasmodics and antihistamines are employed. These include allergies accompanied or unaccompanied by spasms, such as hay fever and asthma, and for intestinal diseases in which smooth muscle spasm is present, such as colitis. It will be appreciated that the new compounds are especially useful and valuable in the treatment of diseases which involve both allergies and muscle spasms, since the compounds are characterized by both antihistaminic and antispasmodic activity. A particular advantage of the new compounds is that they may be administered effectively in low dosages. Five milligrams have been found to be an effective average dose and due to the prolonged effect of the new compounds it is usually only necessary to administer the 5 milligram dosage once each day or once every other day. This is accomplished by incorporating the compounds into 5 milligram tablets in accordance with customary tabletting procedure and technique. The new compounds are also characterized by having an antihistaminic activity equal or superior to known antihistaminics, such as 2-(benzhydryloxy)-N,N-dimethylethylamine hydrochloride ("Benadryl") and the maleate of 2[(2-dimethylaminoethyl)(p-methoxybenzyl)amino]

pyridine ("Pyrilamine"). High activity and prolonged effectiveness have been demonstrated by adequate pharmacological tests which showed, for instance, that tropine 4-chlorobenzhydryl ether hydrochloride was superior to tropine benzhydryl ether hydrochloride in level and duration of activity.

In referring above to the methobromide and methochloride salts of the new compounds, it is understood that other quaternary ammonium salts or derivatives are satisfactory and that the present invention includes such quaternary ammonium salts or derivatives generally. These can be prepared by the reaction with any known or suitable quaternizing agents, e. g., alkyl or aralkyl halides or sulfates, with a tertiary amine responding to the invention.

Within the terms of the appended claims, wherein the invention is defined, other compounds having good antihistaminic and antispasmodic properties are included.

I claim:

1. A halogen substituted tropine benzhydryl ether in which at least one of the two benzene groups of the benzhydryl portion of the molecule is substituted by at least one and not more than two halogen atoms selected from the group consisting of chlorine, bromine and iodine, the said benzene groups being otherwise unsubstituted.

2. A tropine chlorobenzhydryl ether in which at least one of the two benzene groups of the benzhydryl portion of the molecule is substituted by at least one and not more than two halogen atoms selected from the group consisting of chlorine, bromine and iodine, the said benzene groups being otherwise unsubstituted.

3. A tropine bromobenzhydryl ether in which at least one of the two benzene groups of the benzhydryl portion of the molecule is substituted by at least one and not more than two halogen atoms selected from the group consisting of chlorine, bromine and iodine, the said benzene groups being otherwise unsubstituted.

4. A halogenated tropine benzhydryl ether hydrohalide in which at least one of the two benzene groups of the benzhydryl portion of the molecule is substituted by at least one and not more than two halogen atoms selected from the group consisting of chlorine, bromine and iodine, the said benzene groups being otherwise unsubstituted.

5. A halogenated tropine benzhydryl ether salt in which at least one of the two benzene groups of the benzhydryl portion of the molecule is substituted by at least one and not more than two halogen atoms selected from the group consisting of chlorine, bromine and iodine, the said benzene groups being otherwise unsubstituted.

6. The compound represented by the formula:

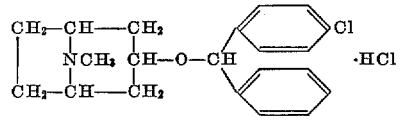

7. The compound represented by the formula:

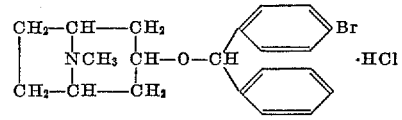

8. The compound represented by the formula:

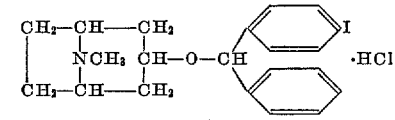

9. The compound represented by the formula:

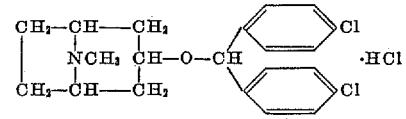

10. The compound represented by the formula:

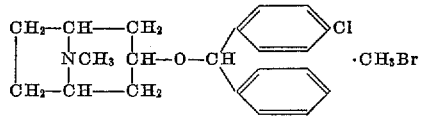

11. The method of preparing tropine 4-chlorobenzhydryl ether which comprises heating 4-chlorobenzophenone with anhydrous hydrazine, oxidizing a 4-chlorobenzophenone hydrazone thus formed to 4-chlorodiphenyldiazomethane and refluxing the latter with tropine in benzene.

12. The method of preparing tropine 4-chlorobenzhydryl ether which comprises refluxing tropine with 4-chlorodiphenyldiazomethane in benzene.

References Cited in the file of this patent

UNITED STATES PATENTS

| | | |
|---|---|---|
| 2,453,729 | Rieveschl | Nov. 16, 1948 |
| 2,454,092 | Rieveschl | Nov. 16, 1948 |
| 2,567,350 | Rieveschl | Sept. 11, 1951 |
| 2,567,351 | Rieveschl | Sept. 11, 1951 |
| 2,595,405 | Phillips | May 6, 1952 |
| 2,706,198 | Weijlard | Apr. 12, 1955 |

OTHER REFERENCES

Simons: Industrial and Engineering Chemistry, vol. 39, 1947, page 238.

UNITED STATES PATENT OFFICE
CERTIFICATE OF CORRECTION

Patent No. 2,799,680                                    July 16, 1957

Stephen Fromer

It is hereby certified that error appears in the printed specification of the above numbered patent requiring correction and that the said Letters Patent should read as corrected below.

Column 2, line 68, for "Hydrogen------------------3.6" read --Nitrogen------------------3.6--; column 6, line 51, for "a 4-chloro-" read --the 4-chloro- --.

Signed and sealed this 3rd day of September 1957.

(SEAL)
Attest:
CARL H. AXLINE
Attesting Officer

ROBERT C. WATSON
Commissioner of Patents